(12) United States Patent
Nori et al.

(10) Patent No.: US 12,417,182 B2
(45) Date of Patent: Sep. 16, 2025

(54) DE-PRIORITIZING SPECULATIVE CODE LINES IN ON-CHIP CACHES

(71) Applicant: Intel Corporation, Santa Clara, CA (US)

(72) Inventors: Anant Vithal Nori, Bangalore (IN); Prathmesh Kallurkar, Bangalore (IN); Niranjan Kumar Soundararajan, Bengalaru (IN); Sreenivas Subramoney, Bangalore (IN); Lihu Rappoport, Haifa (IL); Hanna Alam, Jish (IL); Adrian Moga, Portland, OR (US); Ronak Singhal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 716 days.

(21) Appl. No.: 17/551,172

(22) Filed: Dec. 14, 2021

(65) Prior Publication Data

US 2023/0185718 A1 Jun. 15, 2023

(51) Int. Cl.
*G06F 12/08* (2016.01)
*G06F 12/084* (2016.01)

(52) U.S. Cl.
CPC ........ *G06F 12/084* (2013.01); *G06F 2212/62* (2013.01)

(58) Field of Classification Search
CPC .................. G06F 12/084; G06F 2212/62
See application file for complete search history.

(56) References Cited

U.S. PATENT DOCUMENTS

| 5,699,537 | A | 12/1997 | Sharangpani et al. |
| 5,809,268 | A | 9/1998 | Chan |
| 6,049,866 | A | 4/2000 | Earl |
| 6,208,273 | B1 | 3/2001 | Dye et al. |
| 6,233,645 | B1 | 5/2001 | Chrysos et al. |
| 6,388,585 | B1 | 5/2002 | Lacerda |
| 6,505,293 | B1 | 1/2003 | Jourdan et al. |
| 6,625,723 | B1 | 9/2003 | Jourday et al. |

(Continued)

FOREIGN PATENT DOCUMENTS

| CN | 103810297 A | 5/2014 |
| CN | 114661227 A | 6/2022 |

(Continued)

OTHER PUBLICATIONS

Final Office Action issued in U.S. Appl. No. 17/133,618, issued Jun. 28, 2024, 17 pages.

(Continued)

*Primary Examiner* — Jae U Yu
(74) *Attorney, Agent, or Firm* — NICHOLSON DE VOS WEBSTER & ELLIOTT LLP

(57) ABSTRACT

Methods and apparatus relating to de-prioritizing speculative code lines in on-chip caches are described. In an embodiment, logic circuitry determines whether a storage structure includes a reference to a code miss request prior to transmission of the code miss request to a shared cache. The logic circuitry causes de-prioritization of a code line, corresponding to the code miss request, in the shared cache in response to an absence of the reference in the storage structure. Other embodiments are also disclosed and claimed.

21 Claims, 8 Drawing Sheets

(56) References Cited

U.S. PATENT DOCUMENTS

| | | |
|---|---|---|
| 6,862,662 B1 | 3/2005 | Cloud |
| 6,879,266 B1 | 4/2005 | Dye et al. |
| 7,519,796 B1 | 4/2009 | Golla et al. |
| 8,006,073 B1 | 8/2011 | Ali et al. |
| 8,447,948 B1 | 5/2013 | Erdogan et al. |
| 8,738,860 B1 | 5/2014 | Griffin et al. |
| 9,552,169 B2 | 1/2017 | Rappoport et al. |
| 10,331,558 B2 | 6/2019 | Sazegari et al. |
| 10,671,550 B1 | 6/2020 | Doi |
| 11,625,349 B1 | 4/2023 | Randall et al. |
| 12,028,094 B2 | 7/2024 | Gaur et al. |
| 2002/0124142 A1 | 9/2002 | Har et al. |
| 2002/0174255 A1 | 11/2002 | Hayter et al. |
| 2003/0084274 A1 | 5/2003 | Gaither et al. |
| 2003/0088759 A1 | 5/2003 | Wilkerson |
| 2003/0217251 A1 | 11/2003 | Jourdan et al. |
| 2004/0010679 A1 | 1/2004 | Moritz et al. |
| 2004/0039880 A1* | 2/2004 | Pentkovski ......... G06F 12/0811 711/146 |
| 2005/0160234 A1 | 7/2005 | Newburn et al. |
| 2005/0289300 A1 | 12/2005 | Kim et al. |
| 2006/0101238 A1 | 5/2006 | Bose et al. |
| 2006/0294311 A1* | 12/2006 | Fu ...................... G06F 16/951 707/999.1 |
| 2007/0204135 A1 | 8/2007 | Jiang et al. |
| 2008/0059765 A1 | 3/2008 | Svendsen et al. |
| 2008/0177984 A1 | 7/2008 | Lataille et al. |
| 2008/0256345 A1 | 10/2008 | Bose et al. |
| 2008/0282034 A1 | 11/2008 | Jiao et al. |
| 2009/0150657 A1 | 6/2009 | Gschwind et al. |
| 2010/0223237 A1 | 9/2010 | Mishra et al. |
| 2011/0072213 A1 | 3/2011 | Nickolls et al. |
| 2011/0208918 A1 | 8/2011 | Raikin et al. |
| 2012/0089819 A1 | 4/2012 | Chaudhry et al. |
| 2013/0111605 A1 | 5/2013 | Maeda et al. |
| 2013/0339706 A1 | 12/2013 | Greiner et al. |
| 2014/0095814 A1 | 4/2014 | Marden et al. |
| 2014/0281240 A1 | 9/2014 | Willhalm |
| 2014/0317377 A1 | 10/2014 | Ould-Ahmed-Vall et al. |
| 2014/0372736 A1 | 12/2014 | Greenhalgh et al. |
| 2015/0106567 A1 | 4/2015 | Godard et al. |
| 2015/0178202 A1 | 6/2015 | Sankaran et al. |
| 2015/0178214 A1 | 6/2015 | Alameldeen et al. |
| 2015/0378731 A1 | 12/2015 | Lai et al. |
| 2016/0092373 A1 | 3/2016 | Doshi et al. |
| 2016/0179676 A1 | 6/2016 | Engh-Halstvedt et al. |
| 2016/0321076 A1 | 11/2016 | Satpathy et al. |
| 2016/0321185 A1 | 11/2016 | Doshi et al. |
| 2016/0328172 A1 | 11/2016 | Rappoport et al. |
| 2017/0046164 A1 | 2/2017 | Madhavan et al. |
| 2017/0161076 A1 | 6/2017 | Alapati et al. |
| 2017/0199739 A1 | 7/2017 | Kitchin et al. |
| 2017/0220475 A1 | 8/2017 | Bradbury et al. |
| 2017/0249149 A1 | 8/2017 | Priyadarshi et al. |
| 2017/0322811 A1 | 11/2017 | Abdallah |
| 2017/0371660 A1 | 12/2017 | Smith et al. |
| 2018/0011796 A1 | 1/2018 | Guilford et al. |
| 2018/0152201 A1 | 5/2018 | Gopal et al. |
| 2018/0165097 A1 | 6/2018 | Hanley |
| 2019/0034335 A1 | 1/2019 | Torre et al. |
| 2019/0042354 A1 | 2/2019 | Coquerel et al. |
| 2019/0044852 A1 | 2/2019 | Nolan et al. |
| 2019/0034333 A1 | 6/2019 | Sazegari et al. |
| 2019/0391869 A1 | 12/2019 | Gopal et al. |
| 2020/0190807 A1 | 6/2020 | Header |
| 2020/0249948 A1 | 8/2020 | Giamei et al. |
| 2020/0272474 A1 | 8/2020 | Gabor et al. |
| 2020/0285580 A1 | 9/2020 | Subramanian et al. |
| 2021/0035258 A1 | 2/2021 | Ray et al. |
| 2021/0072994 A1 | 3/2021 | Bainville et al. |
| 2021/0103550 A1 | 4/2021 | Appu et al. |
| 2021/0114495 A1 | 4/2021 | Battaglia et al. |
| 2021/0312697 A1 | 10/2021 | Maiyuran et al. |
| 2021/0374897 A1 | 12/2021 | Ray et al. |
| 2022/0066931 A1 | 3/2022 | Ray et al. |
| 2022/0091880 A1 | 3/2022 | Dutu et al. |
| 2022/0197643 A1 | 6/2022 | Gaur et al. |
| 2022/0197659 A1 | 6/2022 | Gaur et al. |
| 2022/0197794 A1 | 6/2022 | Kallurkar et al. |
| 2022/0197799 A1 | 6/2022 | Gaur et al. |
| 2022/0197813 A1 | 6/2022 | Gaur et al. |
| 2022/0272569 A1 | 8/2022 | Berliner et al. |
| 2022/0295345 A1 | 9/2022 | Trim et al. |
| 2023/0019271 A1 | 1/2023 | Mukherjee et al. |

FOREIGN PATENT DOCUMENTS

| | | |
|---|---|---|
| CN | 114661359 A | 6/2022 |
| CN | 114661625 A | 6/2022 |
| CN | 115793960 A | 3/2023 |
| CN | 116263671 A | 6/2023 |
| EP | 4020185 A1 | 6/2022 |
| EP | 4020223 A1 | 6/2022 |
| EP | 4020230 A1 | 6/2022 |
| EP | 4020231 A1 | 6/2022 |
| EP | 4149008 A1 | 3/2023 |
| EP | 4198749 A1 | 6/2023 |
| JP | H0922353 A | 1/1997 |
| WO | 2020190799 A3 | 9/2020 |
| WO | 2020190807 A1 | 9/2020 |

OTHER PUBLICATIONS

Non-Final Office Action from U.S. Appl. No. 17/133,618, mailed Mar. 15, 2024, 18 pages.

Non-final Office Action issued in U.S. Appl. No. 17/133,615 on Feb. 15, 2024, 16 pages.

Non-Final Office Action for U.S. Appl. No. 17/470,089, mailed Sep. 25, 2024, 13 pages.

Andreas Abel et al., Reverse Engineering of Cache Replacement Policies in Intel Microprocessors and Their Evaluation, 2014 IEEE International Symposium on Performance Analysis of Systems and Software (ISPASS), 3 pages.

Andreas Abel et al., Measurement-based Modeling of the Cache Replacement Policy, 2013 IEEE 19th Real-Time and Embedded Technology and Applications Symposium (RTAS), 10 pages.

Glenn Reinmany et al., Fetch Directed Instruction Prefetching. International Symposium on Microarchitecture (MICRO-32), Nov. 1999, 12 pages.

Pepe Vila et al., CacheQuery: learning replacement policies from hardware caches, 2020 ACM SIGPLAN Conference on Programming Language Design and Implementation, 17 pages.

Examination report for European Application No. 22206038.6, issued Feb. 21, 2024, 8 pages.

Decision to grant European patent for Application No. 21198841.5, Apr. 5, 2024, 2 pages.

European Examination Report, application No. 21198874.6, Oct. 23, 2023, 7 pages.

European Patent Office, Notice of Grant for Application No. 21198841. 5, issued Dec. 14, 2023, 80 pages.

Examination report issued by the European Patent Office for Application No. 21198874.6-1203, issued Jan. 19, 2023, 6 pages.

Extended European Search Report for application No. 22188197. 2-1224, issued Feb. 3, 2023, 10 pages.

Extended European Search Report issued on Mar. 1, 2022 for EP Application No. 2119770.4.

Extended European Search Report issued on Mar. 1, 2022 for EP Application No. 21198841.5.

Extended European Search Report issued on Mar. 16, 2022 for EP Application No. 21198874.6.

Extended European Search Report issued on Apr. 7, 2022 for EP Application No. 21198710.2.

Extended European search report for application No. 22206038.6., issued May 12, 2023, 12 pages.

Abail, et al. "Data Compression Accelerator on IBM POWER9 and z15 Processors," ISCA 2020, 14 pages.

Cao et al. "Characterizing, Modeling, and Benchmarking RocksDB Key-Value Workloads at Facebook," FAST 2020, retrieved from https://b;log.acolyer.org/2020/03/11/rocks-db-at-facebook/ on Nov. 19, 2020, 12 pages.

(56) References Cited

OTHER PUBLICATIONS

Colyer, Adrian, "Software-defined far memory in warehouse scale computers," The Morning Paper, 13 pages, May 22, 2019.
Lagar-Cavilla et al. "Software-Defined Far Memory in Warehouse-Scale Computers," ASPLOS 2019, retrieved from https://blog.acolyer.org/2019/05/22/sw-far-memory/ on Nov. 19, 2020, 11 pages.
Lagar-Cavilla, Andres, et al. "Software-Defined Far Memory in Warehouse-Scale Computers," Session: VM/Memory, ASPLOS '19, Apr. 13-17, 2019, Providence, Rhode Island, pp. 317-330.
Zswap, The Linux Kernel documentation, Linux Memory Management Documentation, retrieved from www.kernel.org/doc/html/latest/vm/zswap.html on Aug. 29, 2021.
Ayers et al., "Asmdb: understanding and mitigating front-end stalls in warehouse-scale computers," ISCA '19, Jun. 22-26, 2019, 12 pages.
Kanev et al., "Profiling a Warehouse-Scale Computer," ISCA'15, Jun. 13-17, 2015, 12 pages.
Reinman et al., "Fetch Directed Instruction Prefetching," Proceedings of the 32nd Annual International Symposium on Microarchitecture (MICRO-32), Nov. 1999, 12 pages.
European Examination report for application No. 22188197.2, issued Aug. 28, 2024, 6 pages.
Notice of Intention to Grant for European Patent Application No. 21198710.2, issued Aug. 2, 2024, 89 pages.
European Patent Office communication regarding Intention to Grant for application No. 21197700.4, issued Jul. 30, 2024, 78 pages.
Intention to Grant Notice issued by the European Patent Office for application No. 22206038.6, issued Jul. 8, 2024, 52 pages.
Notice of Allowance in U.S. Appl. No. 17/133,622, mailed Feb. 29, 2024, 8 pages.
Notice of Intent to Grant from the European Patent Office for application No. 21198710.2, issued Aug. 2, 2024, 87 pages.
Office Action issued for U.S. Appl. No. 17/133,624, mailed Mar. 4, 2024, 12 pages.
Final Office Action issued in U.S. Appl. No. 17/133,624, Aug. 27, 2024, 16 pages.
Non-Final Office Action issued in U.S. Appl. No. 17/133,618, mailed Jan. 24, 2025,.
Non-final Office Action issued in U.S. Appl. No. 17/553,780, mailed Jan. 22, 2025, 14 pages.

\* cited by examiner

DE-PRIORITIZING SPECULATIVE CODE LINES IN ON-CHIP CACHES

FIELD

The present disclosure generally relates to the field of computer processors. More particularly, an embodiment relates to de-prioritizing speculative code lines in on-chip caches.

BACKGROUND

In computing, a "cache" memory is used to store data for faster access by a processor instead of having to access a main memory. Multiple levels of cache may be used, with a lower level cache (e.g., level 1) being closer to the processor than a higher level cache (such as level 2). The lower level cache is generally more expensive and smaller in size than a higher level cache.

Generally, to improve performance, the size of cache can be increased to allow for faster access to data, but the increase in size comes with an increased cost due to the additional footprint and/or an increased power consumption. Hence, any increase to cache sizes would have to be weighed carefully against the costs.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figures 1A, 1B:
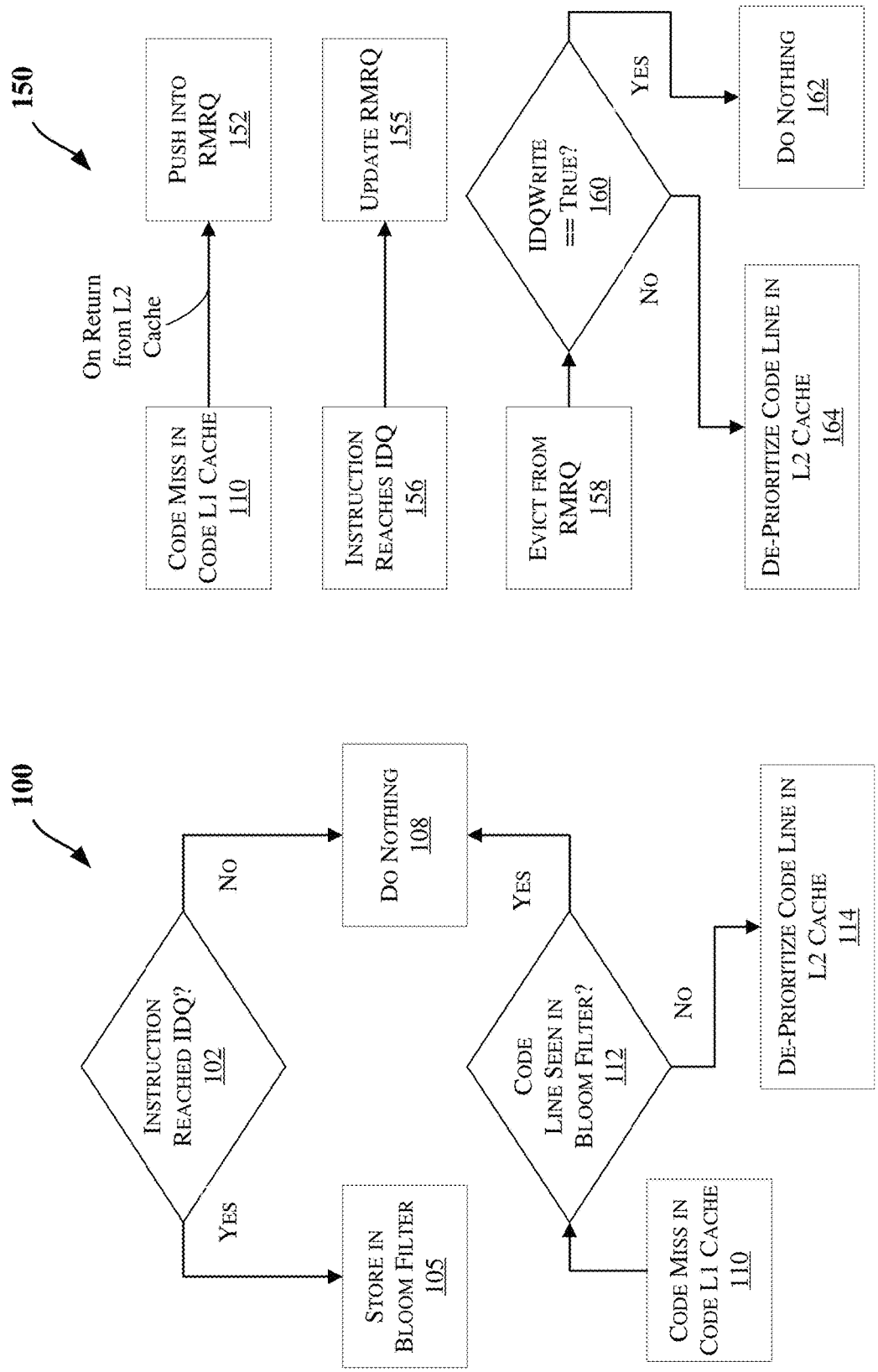
FIGS. 1A and 1B illustrate flow diagrams of methods to de-prioritize speculative code lines in on-chip caches, according to some embodiments.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, any increase to cache sizes would have to be weighed carefully against the costs. Through detailed experiments across a suite of important workloads, it can be observed that a significant fraction of code lines fetched in a processor's on-chip caches are speculative. These speculative code lines belong to unused or rarely used code segments in programs—they are fetched into processor's caches, but their constituent instructions almost never execute. Hence, storing such unneeded code lines at the expense of other frequently used cache lines leads to a performance loss. The problem is exaggerated with the trend towards significantly larger code footprints, due to deep software stacks, interpreted or Just In Time (JIT) code, multiple code instances due to containers and Virtual Machines (VMs) and platform independent code. With such large code footprint workloads, it can be observed that speculative code footprints sometimes range up to three times larger than non-speculative code footprints and occupy nearly 25% to 30% of processor caches such as the Level 1 (L1) code cache and the Level 2 (L2) cache (which is shared between code and data in some implementations).

To this end, some embodiments provide one or more techniques for de-prioritizing speculative code lines in on-chip caches. An embodiment identifies and de-prioritizes such speculative code lines in the L2 cache. By de-prioritizing speculative code lines, some embodiments effectively prioritize storage of non-speculative code lines and data lines in the L2 cache. Through better caching of such L2 frequently accessed lines, a speedup in workload execution can be achieved. This technique can be extended to other on-chip caches storing code lines such as the L1 code cache, shared Last Level Cache (LLC), etc. As discussed herein, a "code line" generally refers to a cache line (e.g., in L2 cache) that stores an instruction or a micro-operation.

Further, it has been observed that in case of workloads with large code footprints, the speculative code footprint can even be much larger than the size of the L2 cache. Hence, even with larger L2 caches, speculative code lines still occupy non-trivial L2 cache capacity. Hence, one or more embodiments can improve performance by allotting L2 cache space of rarely-used speculative code lines to store frequently used code and data lines.

FIGS. 1A and 1B illustrate flow diagrams of methods 100 and 150 to de-prioritize speculative code lines in on-chip caches, according to some embodiments. One or more of the operations of methods 100 and 150 may be performed by one or more components of FIGS. 4-8, such as a processor, processor core, or other logic circuitry discussed herein.

Figure 4:
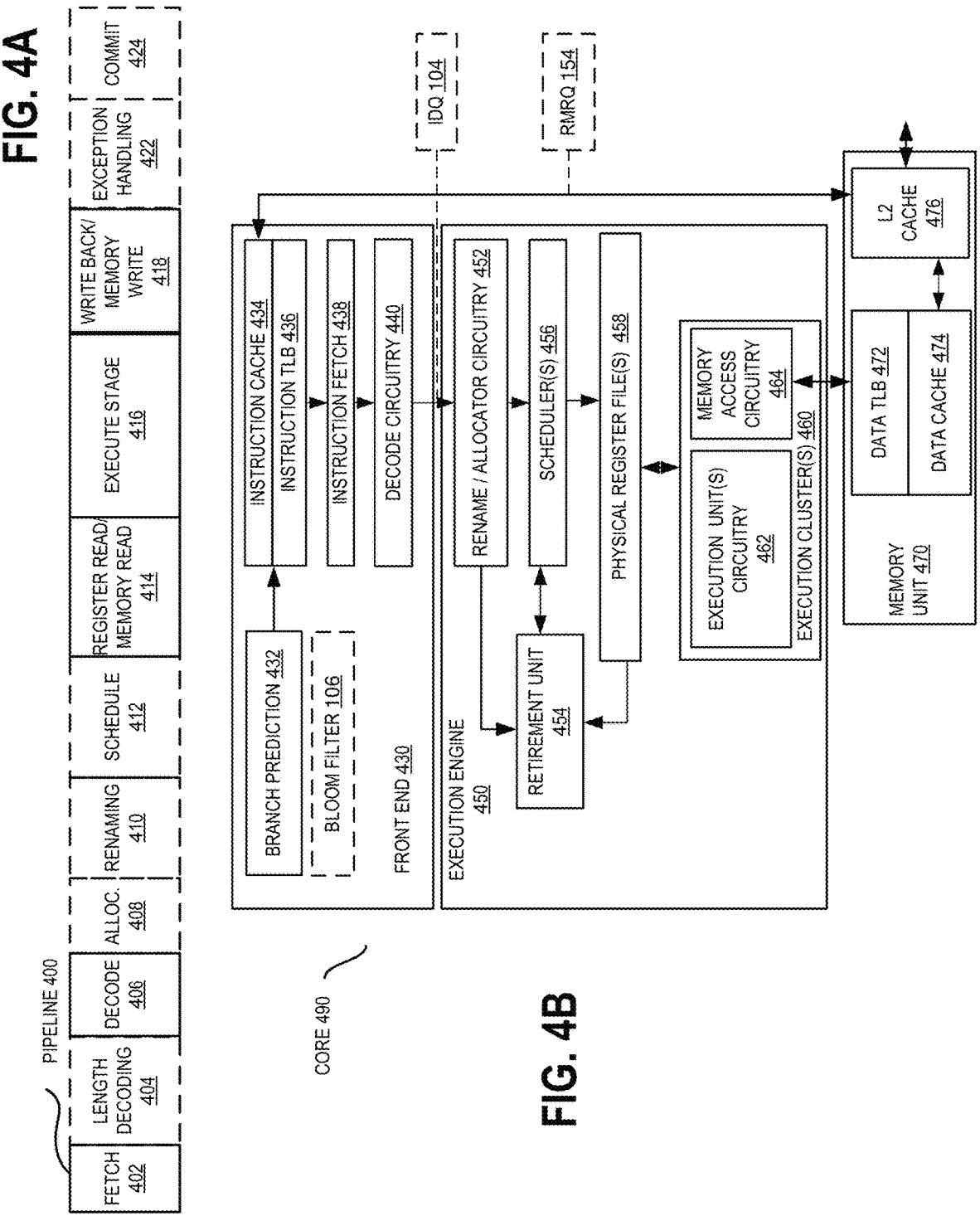
FIG. 4A is a block diagram illustrating both an exemplary in-order pipeline and an exemplary register renaming, out-of-order issue/execution pipeline according to embodiments.
FIG. 4B is a block diagram illustrating both an exemplary embodiment of an in-order architecture core and an exemplary register renaming, out-of-order issue/execution architecture core to be included in a processor according to embodiments.

Referring to FIGS. 1A and 4A-4B, an operation 102 determines whether an instruction has reached pre-allocation or an Instruction Dispatch Queue (IDQ) 104. Once an instruction reaches IDQ at operation 102, operation 105 stores an indicia in a Bloom filter 106 (e.g., indicating that the instruction is likely to retire). As discussed herein, a "Bloom filter" generally refers to a data/storage structure or storage unit (such as those discussed herein with reference to FIGS. 4A-8) used for holding state (in an embodiment, each bit in the Bloom filter denotes a block of 128 B (Bytes) which reached the IDQ 104). Bloom filters are generally used to store approximate state. Because a Bloom filter stores approximate state, the size of a Bloom filter is relatively smaller—and hence Bloom filters are attractive to use in hardware solutions. In an embodiment, the Bloom filter is 8 kB (kilo Bytes), e.g., including four tables of 2 kB each, capable of tracking 128 B code regions. The use of four tables is part of a Bloom filter design; namely, each table may be accessed with a different hash function. The use of multiple hashes reduces the number of false positives in a Bloom filter. Method 100 performs no action at operation 108 if an instruction does not reach the IDQ 104 (e.g., indicating that the instruction is unlikely to retire).

In an embodiment, the Bloom filter hardware may be contained in one hardware cluster, called the front end in some processor implementations. The instruction(s) or micro-operations ("uops") indicia stored in the Bloom filter 106 may include the virtual address of (e.g., all) instruction(s)/uop(s) being allocated in the IDQ 104. In an embodiment, the IDQ 104 is a queue where instructions/uops are stored prior to their allocation in the pre-execution stage of the processor pipeline.

Operation 102 may be performed by logic provided in the front end 430 or execution engine 450, or logic coupled between the front end 430 and the execution engine 450 to identify a simple metric to predict whether a code line (stored in an L2 cache (such as L2 caches discussed herein, e.g., L2 cache 476 of FIG. 4B) is speculative. For example, code lines whose instructions do not reach pre-allocation stage or the IDQ 104 are identified at operation 102, which are likely to be speculative. Generally, the IDQ 104 allows the code processing to run ahead.

In an embodiment, the pre-allocation stage occurs after the decode stage (e.g., decode state 406 of FIG. 4A, so the branch and target information are known at this point, or after decoding by the decode circuitry 440 in the front end 430 of FIG. 4B), but prior to pre-scheduling/pre-allocation into a scheduler, e.g., prior to reaching the allocate stage 408 of FIG. 4A or rename/allocator circuitry 452 and scheduler(s) 456 in the execution engine 450 of FIG. 4B. Doing so before allocation is in part because the identified code line/micro-operation is considered likely to retire (e.g., by the retirement unit 454 of FIG. 4B). Hence, the information stored in the Bloom filter 106 can be used to predict whether a code line is speculative (e.g., by assuming that code lines represented in the Bloom filter are likely to retire).

Subsequently, at an operation 110, a code miss in code L1 cache triggers operation 112 to determine whether a code line corresponding to the code miss in the L1 cache is present in the Bloom filter 106. In an embodiment, operation 112 checks the Bloom filter 106 for the corresponding virtual address of the code miss. If the Bloom filter does not contain an indicia corresponding to the code miss (or otherwise a corresponding reference is absent from the Bloom filter), the code line is deemed as speculative and such speculative lines are assigned lower priority in the L2 cache at operation 114, e.g., both at the time of allocation and demand access. For example, the code miss request may be forwarded to the L2 cache with an indication to de-prioritize that code line in the L2 cache (e.g., with a hit in the L2 cache, the age of the code line is set to 0 (or a lowest priority value for earliest eviction from the L2 cache), and with a miss in L2 cache, an entry is inserted into the L2 cache for the code line with age 0 (or a lowest priority value for earliest eviction from the L2 cache)). Otherwise if the code line is not seen in the Bloom filter at operation 112, method 100 performs no action at operation 108.

Moreover, in an embodiment, at operation 112, a miss in the Bloom filter 106 (which means that the 128 B block has not been seen in IDQ 104) is a true miss—not a false negative. But, a hit in the Bloom filter 106 means that the 128 B block may or may not have reached the IDQ 104—false positives are possible. A false positive would, however, not hurt/reduce performance relative to current implementations, and would merely potentially reduce the performance upside of embodiments since code lines that could have been de-prioritized are not being de-prioritized. Further, some embodiments use an 8 KB Bloom filter that tracks code bytes at 128 B granularity, as this is found to potentially reduce false positives.

Referring to FIGS. 1B and 4A-4B, upon a code miss in code L1 cache at operation 110, operation 152 pushes the code line fetched from the L2 cache in a queue called Recent Multi-Level Cache (MLC) Return Queue (RMRQ) 154. In an embodiment, RMRQ 154 is a 16-entry queue First In First Out (FIFO) queue. Each RMRQ entry contains four fields:

(1) PhysAddr: Physical address of the code line (e.g., 58 bits);
(2) VirtAddr: Virtual address of the code line (e.g., 58 bits);
(3) IDQWrite Flag: (e.g., 1 bit) which is set to TRUE at operation 155 after at least one instruction from the code line is pushed/allocated into the IDQ 104 at operation 156 (which stores pre-execution stage instructions; and
(4) Valid Flag: (e.g., 1 bit) denoting if a corresponding RMRQ entry is for a valid line.

A new entry is pushed into RMRQ 154 at operation 152 when a code line is fetched from L2 cache, e.g., into an Instruction Stream Buffer (ISB, which may function in a manner similar to a code cache's MSHR (Miss Status Handling Register)). Moreover, the MSHR holds the request that missed in code L1 cache and is responsible for filling back into the code L1 cache once MSHR receives data from the L2 cache. For the oldest entry popped/evicted from RMRQ 154 at an operation 158, there are the following possibilities:

(A) Valid field is FALSE: This was an invalid RMRQ entry. No further action is taken.
(B) IDQWrite field is TRUE (as determined by operation 160): This code line's instructions may be executed. Hence, there is no need to deprioritize this code line (hence, method 150 performs no task at operation 162).
(C) IDQWrite field is FALSE (as determined by operation 160): This code line's instructions may not be executed since there is no corresponding entry in the IDQ 104. Hence, this code line needs to be de-prioritized in the L2 cache at operation 164 in response to absence of a corresponding reference in the IDQ 104. In an embodiment, a request to de-prioritize the code line is sent to the L2 cache (e.g., via L2 controller (not shown)) at operation 164.

When an instruction is pushed into the IDQ 104, the IDQWrite field is set to TRUE for the RMRQ entry whose VirtAddr matches the instruction's program counter.

Furthermore, with respect to the de-prioritization signal (sent at operation 164), arbitration logic of a L2 cache controller's determines which request will arbitrate the L2 cache in a particular cycle. The L2 cache controller (not shown but may be coupled to and/or located on the same integrated circuit device as the L2 cache) may be modified to assign the highest priority to L2 de-prioritization requests received from the RMRQ 154. Hence, in cycles where a valid L2 de-prioritization request is received, L2 controller arbitrates the L2 cache, and for the code line whose address matches the requested address, the priority value is set to 0 (lowest priority value for earliest eviction from the L2 cache).

Moreover, the RMRQ mechanism requires minimal hardware (e.g., 250 bytes) but its implementation may require communication between two hardware clusters—the front end 430 and the L2 cache 476.

Hence, method 150 tracks code lines (in a queue of about 250 Bytes) returned from the L2 cache 476 and whether they reach the IDQ 104. For code lines that do not reach the IDQ, a (e.g., data-less) request is issued to the L2 cache to de-prioritize the identified code line in the L2 cache. The data-less request may include the code line address with another flag (e.g., 2 bits) to cause the age of that code line to be set to 0 (or lowest priority value for earliest eviction from the L2 cache).

Referring to FIGS. 1A and 1B, one or more embodiments are able to:

(1) Predict if a code line is speculative: for example, a code line is deemed as speculative if its constituent instructions do not reach the pre-allocation stage (e.g., the IDQ in a processor pipeline). The quantitative support for this result comes from evaluations across multiple workloads—where the differences in measured footprints at the Front End (FE) (e.g., IFU (Instruction Fetch Unit) lookup), IDQ, and retire stages (see FIGS. 4A and 4B) can be observed.

(2) De-prioritize speculative code lines in the L2 cache. Two different techniques are proposed to achieve this:

(i) using a Bloom filter to tag code line misses: A program counter (e.g., in the form of a virtual address) of instructions reaching IDQ 104 can be recorded in the Bloom filter 106. This Bloom filter can be consulted to tag a code miss as speculative (upon a miss in the Bloom filter) or non-speculative (a hit in the Bloom filter) before sending a code miss request to L2 cache;

(ii) using RMRQ to decrement priority: information about code lines recently fetched from L2 cache are tracked in a queue called RMRQ. Using this queue, it can be determined if a code line's instruction has not reached the pre-execution/pre-allocation/IDQ stage, e.g., in a stipulated amount of time based on comparison with a threshold time value. A signal is in turn sent to the L2 cache (or the L2 cache controller (not shown)) to decrement priority of such lines.

Figure 2:
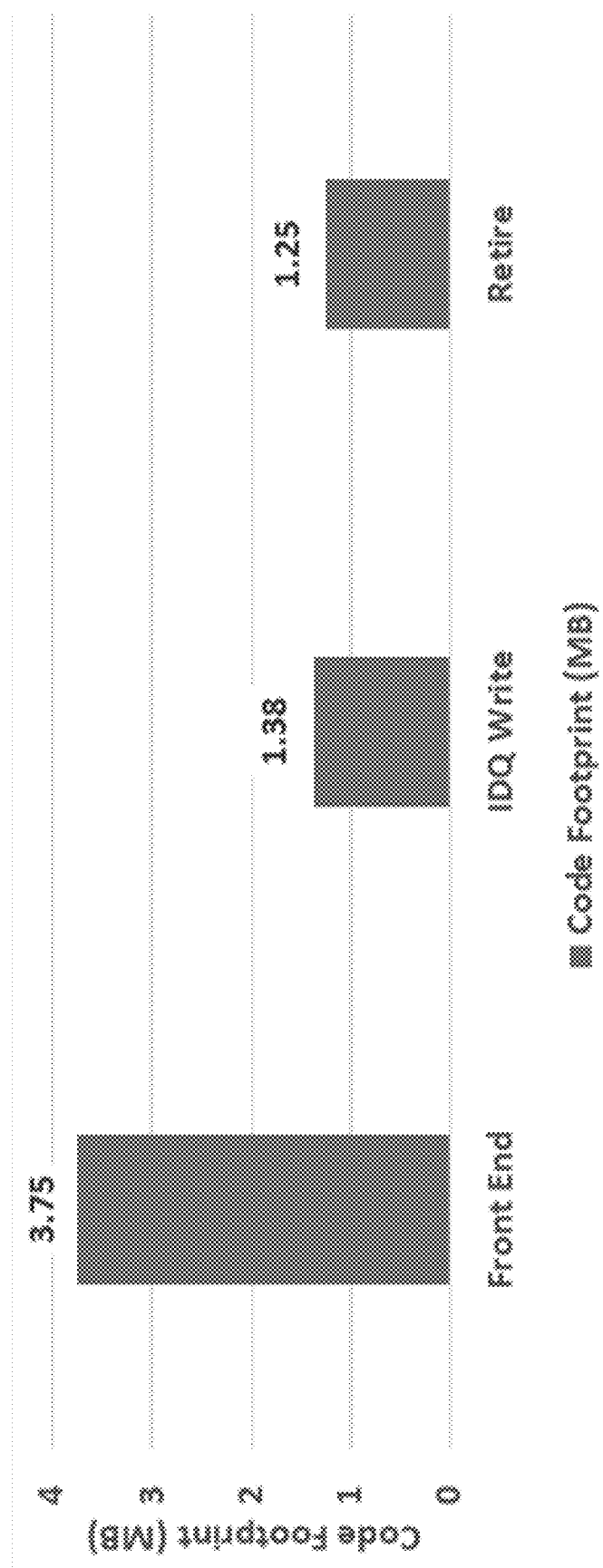
FIG. 2 illustrates a sample average code footprint observed across stages in a processor pipeline for large code footprint workloads, according to an embodiment.

FIG. 2 illustrates a sample average code footprint observed across stages in a processor pipeline for large code footprint workloads, according to an embodiment. A code line is considered non-speculative if the instructions of the code line are executed by the processor. By reference to FIG. 2, it can be observed that most instructions that are eventually executed by the processor reach the pre-execution stage. This can be observed by tracking unique code footprints observed at different stages in the pipeline. As shown in FIG. 2, the unique code footprint observed at the pre-execution stage (i.e., IDQ write) is almost the same as retired/executed stage.

Referring to FIG. 2, this information augments one or more embodiments in the following ways: (1) instructions may reach the pre-execution stage approximately 1000+ cycles earlier than the retired stage; hence, tracking pre-execution stage results in an early indication about whether a line is speculative or not; and (2) the hardware cluster for the pre-execution stage (IDQ write) is located next to the front end, where the decision about deprioritizing code lines is made; hence, resulting in tracking pre-execution stage results in a smaller and less complicated communication channel.

Figure 3:
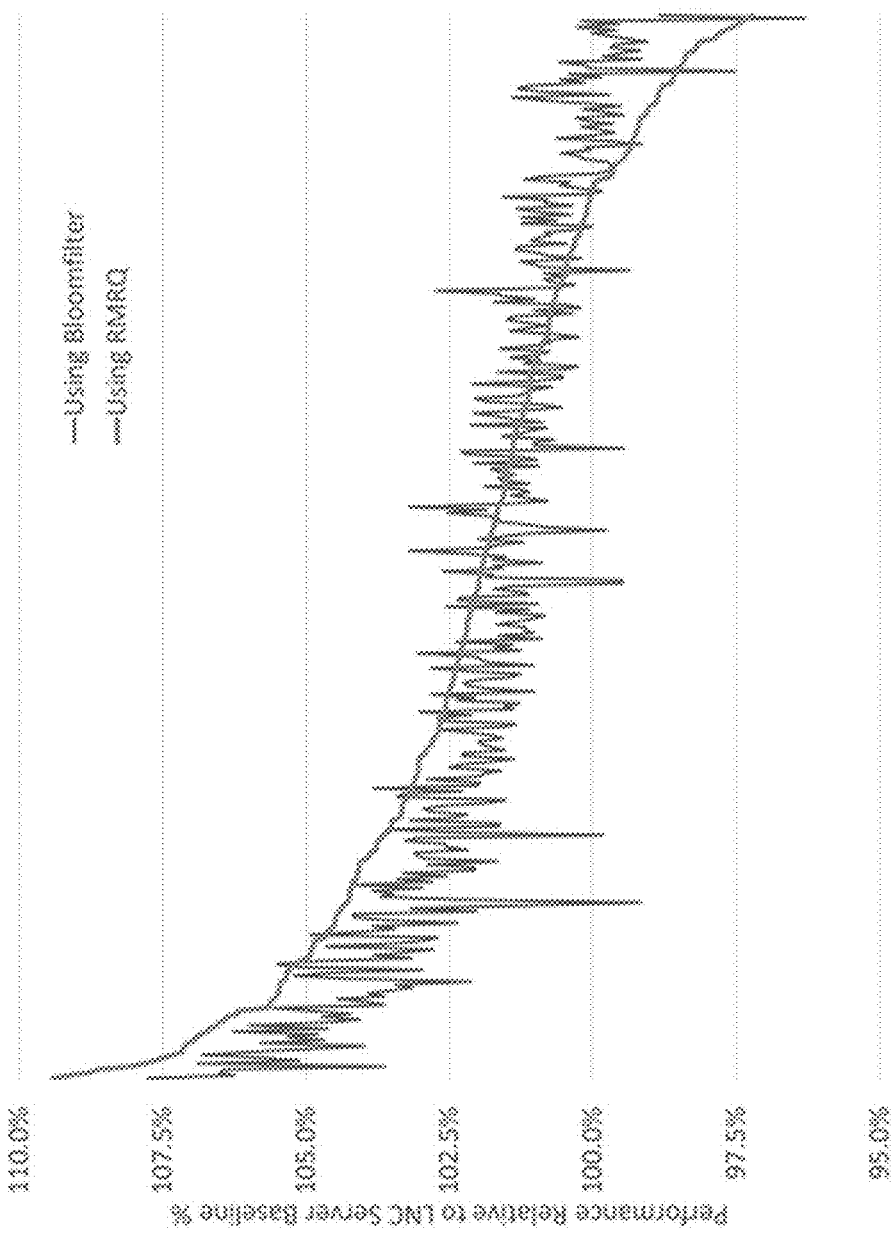
FIG. 3 illustrates the impact of proposed techniques on a suite of large code footprint workloads, according to an embodiment.

FIG. 3 illustrates the impact of proposed techniques on a suite of large code footprint workloads, according to an embodiment. The baseline system mimics a sample server processor. Over a suite of 369 workloads, the proposed Bloom filter 106 and RMRQ 154 approaches improve a workload's performance (geometric mean) by about 1.8 percent and 2 percent, respectively. Also, for the top 50 workloads (in terms of code footprint), the proposed Bloom filter and RMRQ techniques improve workload performance by about 4.6% and 6.2%, respectively.

Accordingly, at least one embodiment deprioritizes speculative code lines in the L2 cache by: (1) identifying a simple metric to predict if a code line is speculative or not (for example, code lines whose instructions do not reach the pre-allocation stage/IDQ are identified, which are very likely to be speculative); and (2) using the above-mentioned metric with one of two techniques to de-prioritize speculative code lines in the L2 cache. Both techniques under (2) may make minimal changes to existing hardware. Also, the above heuristic (1) enables low-hardware-cost solutions to optimize for speculative lines in at least one embodiment.

Even with limited hardware requirements, these features can enable performance gains of about 2% for a suite of large code footprint workloads (such games, databases, and web workloads). For the top 50 workloads (in terms of code footprint), the performance gains can be between approximately 4% and 6%. Since the proposed feature only selectively targets speculative code lines that are not critical for performance, it is not envisioned to degrade performance in other conditions.

Additionally, some embodiments may be applied in computing systems that include one or more processors (e.g., where the one or more processors may include one or more processor cores), such as those discussed with reference to FIG. 1A et seq., including for example a desktop computer, a workstation, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

FIG. 4A is a block diagram illustrating both an exemplary in-order pipeline and an exemplary register renaming, out-of-order issue/execution pipeline according to embodiments. FIG. 4B is a block diagram illustrating both an exemplary embodiment of an in-order architecture core and an exemplary register renaming, out-of-order issue/execution architecture core to be included in a processor according to embodiments. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a writemask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s)

unit(s) 458 and the memory unit 470 perform the register read/memory read stage 414; the execution cluster 460 perform the execute stage 416; 4) the memory unit 470 and the physical register file(s) unit(s) 458 perform the write back/memory write stage 418; 4) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

Figure 5:
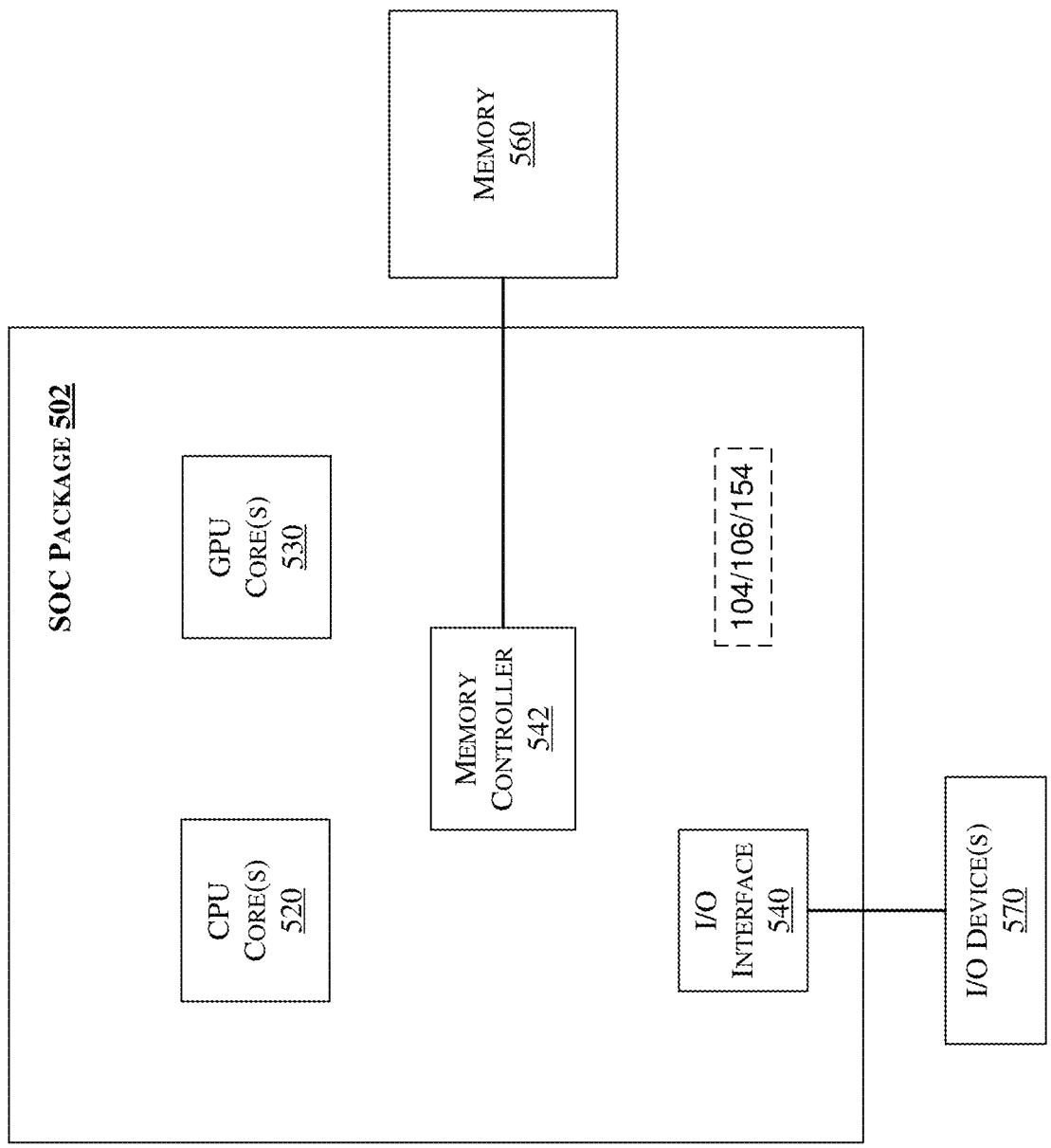
FIG. 5 illustrates a block diagram of an SOC (System On Chip) package in accordance with an embodiment.

FIG. 5 illustrates a block diagram of an SOC package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 502 may include one or more other components, e.g., as discussed with reference to the other figures herein. In one embodiment, SOC package 502 (and its components) is provided on one or more Integrated Circuit (IC) die, e.g., which are packaged into a single semiconductor device.

As illustrated in FIG. 5, SOC package 502 is coupled to a memory 560 via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device(s) 570 may include one or more of a keyboard, a mouse, a touchpad, a display, an image/video capture device (such as a camera or camcorder/video recorder), a touch screen, a speaker, or the like.

Figure 6:
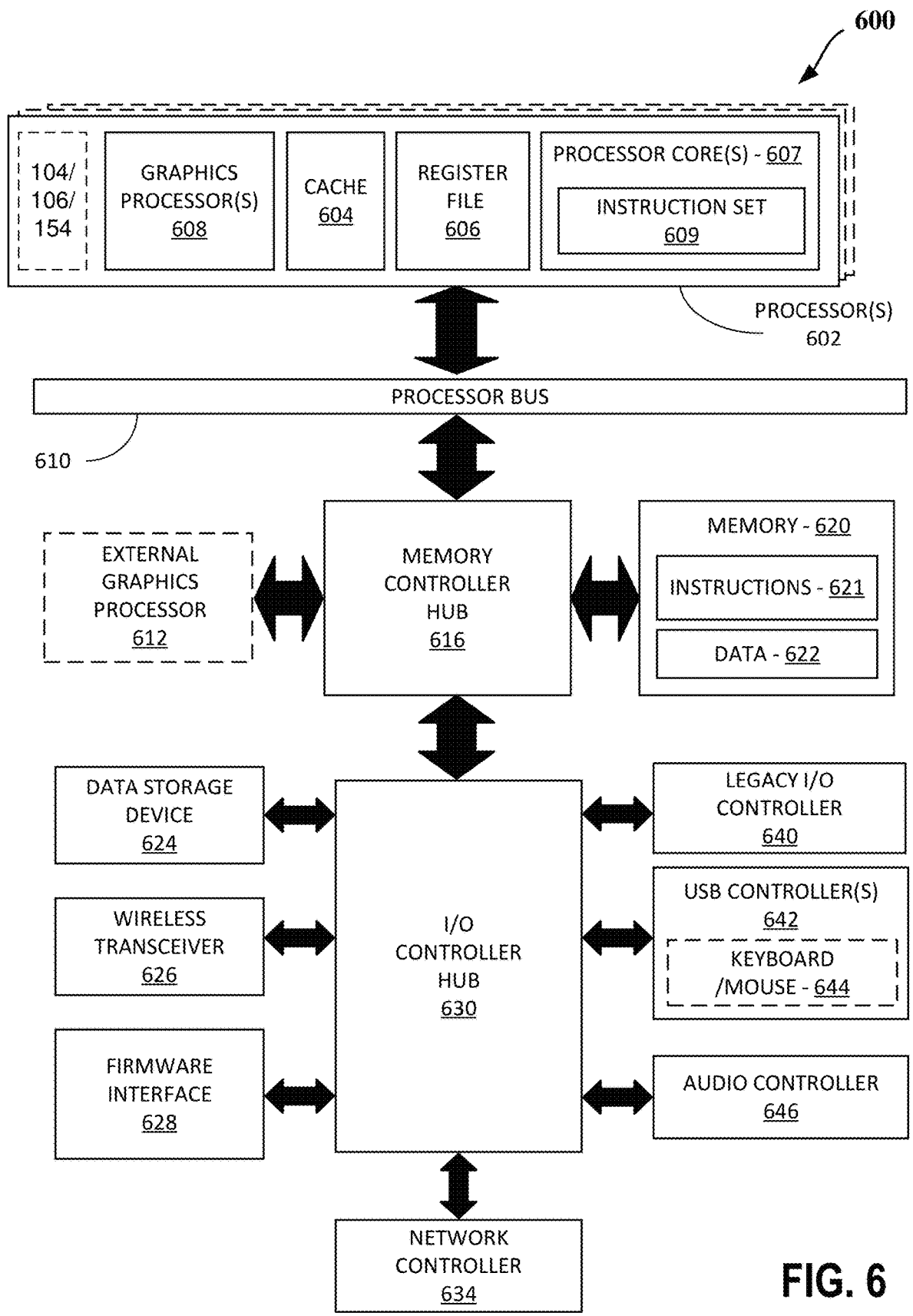
FIG. 6 is a block diagram of a processing system, according to an embodiment.

FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include, or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level 3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary 'hub' system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random access memory (DRAM) device, a static random access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Figure 7:
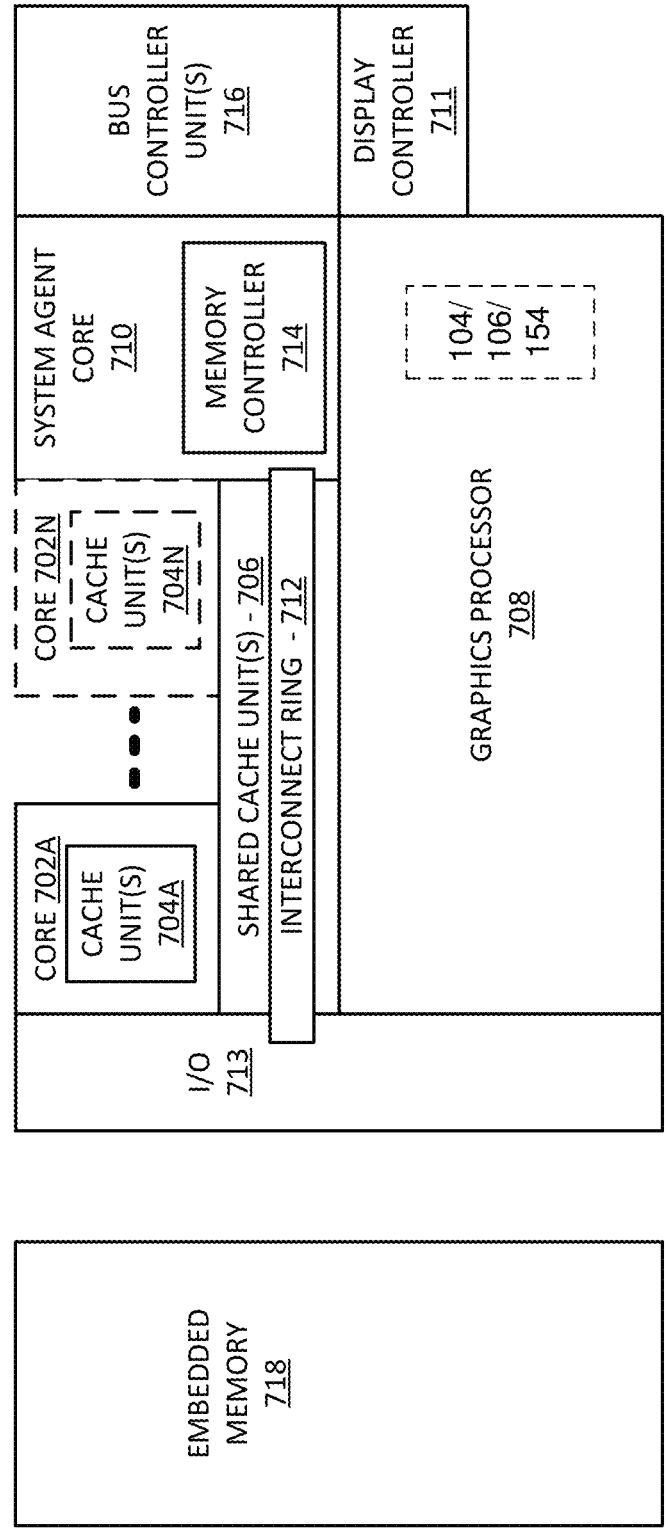
FIG. 7 is a block diagram of an embodiment of a processor having one or more processor cores, according to some embodiments.

FIG. 7 is a block diagram of an embodiment of a processor 700 having one or more processor cores 702A to 702N, an integrated memory controller 714, and an integrated graphics processor 708. Those elements of FIG. 7 having the same reference numbers (or names) as the elements of any other figure herein can operate or function in any manner similar to that described elsewhere herein, but are not limited to such. Processor 700 can include additional cores up to and including additional core 702N represented by the dashed lined boxes. Each of processor cores 702A to 702N includes one or more internal cache units 704A to 704N. In some embodiments each processor core also has access to one or more shared cached units 706.

The internal cache units 704A to 704N and shared cache units 706 represent a cache memory hierarchy within the processor 700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 706 and 704A to 704N.

In some embodiments, processor 700 may also include a set of one or more bus controller units 716 and a system agent core 710. The one or more bus controller units 716 manage a set of peripheral buses, such as one or more Peripheral Component Interconnect buses (e.g., PCI, PCI Express). System agent core 710 provides management functionality for the various processor components. In some embodiments, system agent core 710 includes one or more integrated memory controllers 714 to manage access to various external memory devices (not shown).

In some embodiments, one or more of the processor cores 702A to 702N include support for simultaneous multi-threading. In such embodiment, the system agent core 710 includes components for coordinating and operating cores 702A to 702N during multi-threaded processing. System agent core 710 may additionally include a power control unit (PCU), which includes logic and components to regulate the power state of processor cores 702A to 702N and graphics processor 708.

In some embodiments, processor 700 additionally includes graphics processor 708 to execute graphics processing operations. In some embodiments, the graphics processor 708 couples with the set of shared cache units 706, and the system agent core 710, including the one or more integrated memory controllers 714. In some embodiments, a display controller 711 is coupled with the graphics processor 708 to drive graphics processor output to one or more coupled displays. In some embodiments, display controller 711 may be a separate module coupled with the graphics processor via at least one interconnect, or may be integrated within the graphics processor 708 or system agent core 710.

In some embodiments, a ring based interconnect unit 712 is used to couple the internal components of the processor 700. However, an alternative interconnect unit may be used, such as a point-to-point interconnect, a switched interconnect, or other techniques, including techniques well known in the art. In some embodiments, graphics processor 708 couples with the ring interconnect 712 via an I/O link 713.

The exemplary I/O link 713 represents at least one of multiple varieties of I/O interconnects, including an on package I/O interconnect which facilitates communication between various processor components and a high-performance embedded memory module 718, such as an eDRAM (or embedded DRAM) module. In some embodiments, each of the processor cores 702 to 702N and graphics processor 708 use embedded memory modules 718 as a shared Last Level Cache.

In some embodiments, processor cores 702A to 702N are homogenous cores executing the same instruction set architecture. In another embodiment, processor cores 702A to 702N are heterogeneous in terms of instruction set architecture (ISA), where one or more of processor cores 702A to 702N execute a first instruction set, while at least one of the other cores executes a subset of the first instruction set or a different instruction set. In one embodiment processor cores 702A to 702N are heterogeneous in terms of microarchitecture, where one or more cores having a relatively higher power consumption couple with one or more power cores having a lower power consumption. Additionally, processor 700 can be implemented on one or more chips or as an SoC integrated circuit having the illustrated components, in addition to other components.

Figure 8:
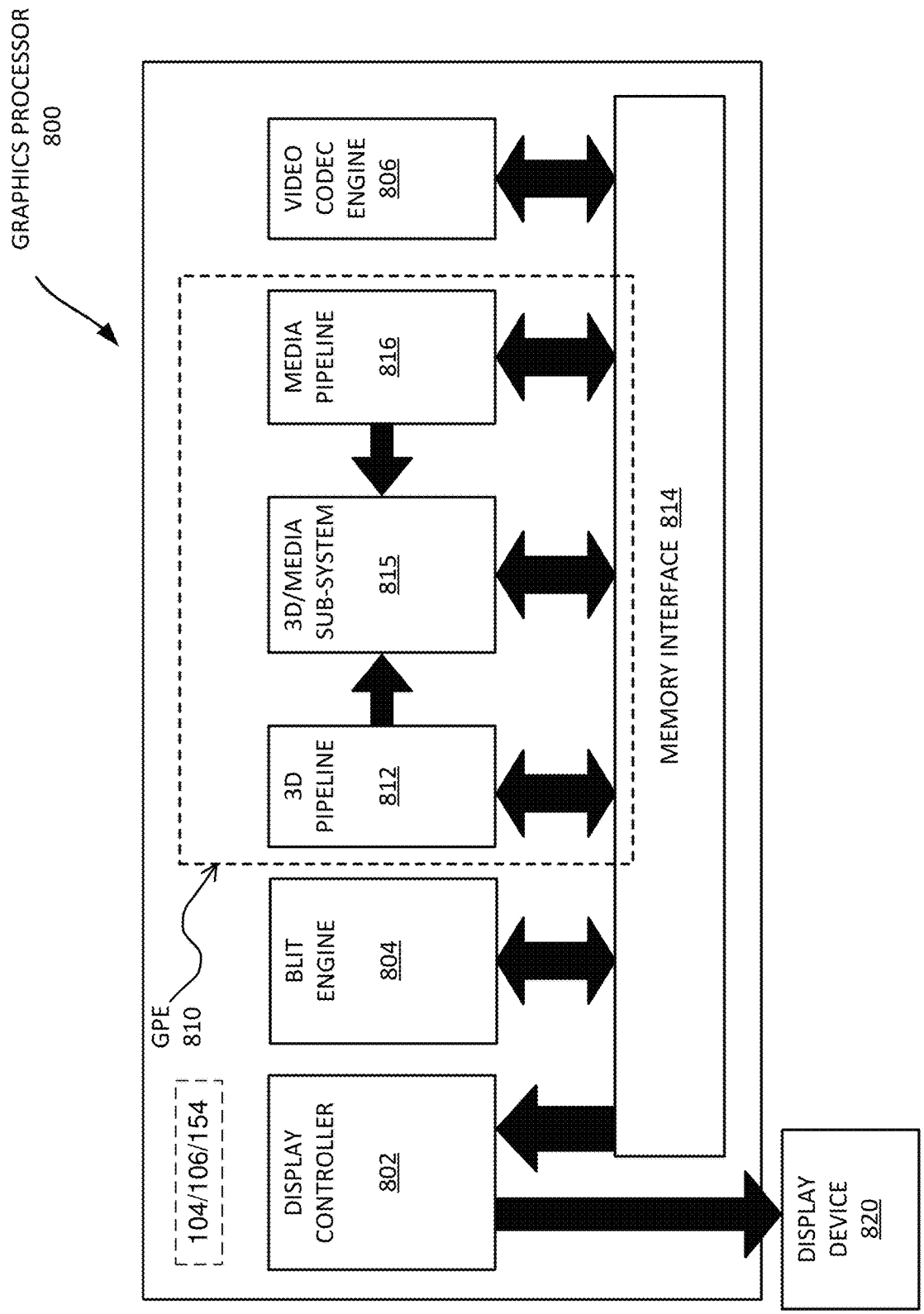
FIG. 8 is a block diagram of a graphics processor, according to an embodiment.

FIG. 8 is a block diagram of a graphics processor 800, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 800 includes a memory interface 814 to access memory. Memory interface 814 can be an interface to local memory, one or more internal caches, one or more shared external caches, and/or to system memory.

In some embodiments, graphics processor 800 also includes a display controller 802 to drive display output data to a display device 820. Display controller 802 includes hardware for one or more overlay planes for the display and composition of multiple layers of video or user interface elements. In some embodiments, graphics processor 800 includes a video codec engine 806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 800 includes a block image transfer (BLIT) engine 804 to perform two-dimensional (2D) rasterizer operations including, for example, bit-boundary block transfers. However, in one embodiment, 3D graphics operations are performed using one or more components of graphics processing engine (GPE) 810. In some embodiments, graphics processing engine 810 is a compute engine for performing graphics operations, including three-dimensional (3D) graphics operations and media operations.

In some embodiments, GPE 810 includes a 3D pipeline 812 for performing 3D operations, such as rendering three-dimensional images and scenes using processing functions that act upon 3D primitive shapes (e.g., rectangle, triangle, etc.). The 3D pipeline 812 includes programmable and fixed function elements that perform various tasks within the element and/or spawn execution threads to a 3D/Media sub-system 815. While 3D pipeline 812 can be used to perform media operations, an embodiment of GPE 810 also includes a media pipeline 816 that is specifically used to perform media operations, such as video post-processing and image enhancement.

In some embodiments, media pipeline 816 includes fixed function or programmable logic units to perform one or more specialized media operations, such as video decode acceleration, video de-interlacing, and video encode acceleration in place of, or on behalf of video codec engine 806. In some embodiments, media pipeline 816 additionally includes a thread spawning unit to spawn threads for execution on 3D/Media sub-system 815. The spawned threads perform computations for the media operations on one or more graphics execution units included in 3D/Media sub-system 815.

In some embodiments, 3D/Media subsystem 815 includes logic for executing threads spawned by 3D pipeline 812 and media pipeline 816. In one embodiment, the pipelines send thread execution requests to 3D/Media subsystem 815, which includes thread dispatch logic for arbitrating and dispatching the various requests to available thread execution resources. The execution resources include an array of graphics execution units to process the 3D and media threads. In some embodiments, 3D/Media subsystem 815 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: logic circuitry to determine whether a storage structure includes a reference to a code miss request prior to transmission of the code miss request to a shared cache; and the logic circuitry to cause de-prioritization of a code line, corresponding to the code miss request, in the shared cache in response to an absence of the reference in the storage structure, wherein the code miss request is directed at the shared cache. Example 2 includes the apparatus of example 1, wherein the storage structure comprises a Bloom filter. Example 3 includes the apparatus of example 1, wherein the shared cache is a Level 2 (L2) cache. Example 4 includes the apparatus of example 1, wherein the code miss request is directed at the shared cache after a miss in a code Level 1 (L1) cache. Example 5 includes the apparatus of example 1, wherein the storage structure is to store an indicia of one or more instructions or one or more micro-operations that have been allocated in an Instruction Dispatch Queue (IDQ). Example 6 includes the apparatus of example 5, wherein the IDQ is to store an instruction or micro-operation prior to allocation in a pre-execution stage of a processor pipeline. Example 7 includes the apparatus of example 1, wherein the storage structure is to store a virtual address of one or more instructions or one or more micro-operations that have been allocated in an IDQ. Example 8 includes the apparatus of example 7, wherein the IDQ is to store an instruction or micro-operation prior to allocation in a pre-execution stage of a processor pipeline. Example 9 includes the apparatus of example 1, wherein the logic circuitry is to forward the code miss request to the shared cache with an indication to de-prioritize the code line in the shared cache in response to the absence of the reference in the storage structure. Example 10 includes the apparatus of example 1, wherein the shared cache is to be shared amongst a plurality of processor cores of a processor. Example 11 includes the apparatus of example 1, wherein a processor, having one or more processor cores, comprises one or more of: the logic circuitry and the shared cache.

Example 12 includes an apparatus comprising: a queue to store an entry for one or more recently fetched code lines from a shared cache; and logic circuitry to determine whether the queue includes a matching entry corresponding to an instruction or micro-operation stored in an Instruction Dispatch Queue (IDQ); and the logic circuitry to cause de-prioritization of a code line in the shared cache in response to an absence of the matching entry in the queue. Example 13 includes the apparatus of example 12, wherein each entry of the queue comprises a physical address of a code line, a virtual address of the code line, an IDQ write flag for the code line, and a valid flag for the code line. Example 14 includes the apparatus of example 13, wherein the IDQ write flag is to be updated in response to storage of the instruction or micro-operation in the IDQ. Example 15 includes the apparatus of example 12, wherein the logic circuitry is to cause transmission of a request to the shared cache to cause de-prioritization of the code line in the shared cache. Example 16 includes the apparatus of example 15, wherein the request comprises an address of the code line and an indication to de-prioritize the code line in the shared cache. Example 17 includes the apparatus of example 12, wherein the shared cache is a Level 2 (L2) cache. Example 18 includes the apparatus of example 12, wherein the shared cache is to be shared amongst a plurality of processor cores of a processor. Example 19 includes the apparatus of example 12, wherein a processor, having one or more processor cores, comprises one or more of: the logic circuitry and the shared cache.

Example 20 includes one or more non-transitory computer-readable media comprising one or more instructions that when executed on a processor configure the processor to perform one or more operations to cause: logic circuitry to determine whether a storage structure includes a reference to a code miss request prior to transmission of the code miss request to a shared cache; and the logic circuitry to cause de-prioritization of a code line, corresponding to the code miss request, in the shared cache in response to an absence of the reference in the storage structure, wherein the code miss request is directed at the shared cache. Example 21 includes the one or more computer-readable media of example 20, further comprising one or more instructions that when executed on the processor configure the at least one processor to perform one or more operations to cause the storage structure to store an indicia of one or more instructions or one or more micro-operations that have been allocated in an Instruction Dispatch Queue (IDQ). Example 22 includes the one or more computer-readable media of example 20, further comprising one or more instructions that when executed on the processor configure the at least one processor to perform one or more operations to cause the storage structure to store a virtual address of one or more instructions or one or more micro-operations that have been allocated in an IDQ.

Example 23 includes an apparatus comprising means to perform a method as set forth in any preceding example. Example 24 includes machine-readable storage including machine-readable instructions, when executed, to implement a method or realize an apparatus as set forth in any preceding example.

In various embodiments, one or more operations discussed with reference to FIG. 1A et seq. may be performed by one or more components (interchangeably referred to herein as "logic") discussed with reference to any of the figures.

In various embodiments, the operations discussed herein, e.g., with reference to FIG. 1A et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic circuitry to determine whether a storage structure includes a reference to a code miss request prior to transmission of the code miss request to a shared cache; and
   the logic circuitry to cause de-prioritization of a code line, corresponding to the code miss request, in the shared cache in response to an absence of the reference in the storage structure,
   wherein the code miss request is directed at the shared cache, wherein the storage structure is to store an indicia or a virtual address of one or more instructions or one or more micro-operations that have been allocated in an Instruction Dispatch Queue (IDQ), wherein the IDQ is to store an instruction or micro-operation prior to allocation in a pre-execution stage of a processor pipeline.

2. The apparatus of claim 1, wherein the storage structure comprises a Bloom filter.

3. The apparatus of claim 1, wherein the shared cache is a Level 2 (L2) cache.

4. The apparatus of claim 1, wherein the code miss request is directed at the shared cache after a miss in a code Level 1 (L1) cache.

5. The apparatus of claim 1, wherein the logic circuitry is to forward the code miss request to the shared cache with an indication to de-prioritize the code line in the shared cache in response to the absence of the reference in the storage structure.

6. The apparatus of claim 1, wherein the shared cache is to be shared amongst a plurality of processor cores of a processor.

7. The apparatus of claim 1, wherein a processor, having one or more processor cores, comprises one or more of: the logic circuitry and the shared cache.

8. An apparatus comprising:
   a queue to store an entry for one or more recently fetched code lines from a shared cache; and
   logic circuitry to determine whether the queue includes a matching entry corresponding to an instruction or micro-operation stored in an Instruction Dispatch Queue (IDQ); and
   the logic circuitry to cause de-prioritization of a code line in the shared cache in response to an absence of the matching entry in the queue.

9. The apparatus of claim 8, wherein each entry of the queue comprises a physical address of a code line, a virtual address of the code line, an IDQ write flag for the code line, and a valid flag for the code line.

10. The apparatus of claim 9, wherein the IDQ write flag is to be updated in response to storage of the instruction or micro-operation in the IDQ.

11. The apparatus of claim 8, wherein the logic circuitry is to cause transmission of a request to the shared cache to cause de-prioritization of the code line in the shared cache.

12. The apparatus of claim 11, wherein the request comprises an address of the code line and an indication to de-prioritize the code line in the shared cache.

13. The apparatus of claim 8, wherein the shared cache is a Level 2 (L2) cache.

14. The apparatus of claim 8, wherein the shared cache is to be shared amongst a plurality of processor cores of a processor.

15. The apparatus of claim 8, wherein a processor, having one or more processor cores, comprises one or more of: the logic circuitry and the shared cache.

16. One or more non-transitory computer-readable media comprising one or more instructions that when executed on a processor configure the processor to perform:
   determining whether a storage structure includes a reference to a code miss request prior to transmission of the code miss request to a shared cache; and
   causing de-prioritization of a code line, corresponding to the code miss request, in the shared cache in response to an absence of the reference in the storage structure, wherein the code miss request is directed at the shared cache, and wherein the storage structure is to store an indicia or a virtual address of one or more instructions or one or more micro-operations that have been allocated in an Instruction Dispatch Queue (IDQ), wherein the IDQ is to store an instruction or micro-operation prior to allocation in a pre-execution stage of a processor pipeline.

17. The one or more computer-readable media of claim 16, wherein the storage structure comprises a Bloom filter.

18. The one or more computer-readable media of claim 16, wherein the shared cache is a Level 2 (L2) cache.

19. The one or more computer-readable media of claim 16, wherein the code miss request is directed at the shared cache after a miss in a code Level 1 (L1) cache.

20. The one or more computer-readable media of claim 16, further comprising one or more instructions that when executed on the processor configure the processor to perform forwarding the code miss request to the shared cache with an indication to de-prioritize the code line in the shared cache in response to the absence of the reference in the storage structure.

21. The one or more computer-readable media of claim 16, further comprising one or more instructions that when executed on the processor configure the processor to perform sharing the shared cache amongst a plurality of processor cores of the processor.

\* \* \* \* \*